July 13, 1965  W. H. VAN GRAAFEILAND  3,194,117
LARGE APERTURE PROJECTION LENS
Filed Nov. 13, 1962

| EXAMPLE 5 | F/1.0 | | F = 100mm | BF = 20.3mm |
|---|---|---|---|---|
| LENS | $N_D$ | V | RADII | SPACING |
| I | 1.611 | 58.8 | $R_1 = +108.7mm$ | $t_1 = 21.7mm$ |
|  |  |  | $R_2 = \infty$ | $s_1 = 11.6$ |
| II | 1.880 | 41.1 | $R_3 = +86.7$ | $t_2 = 26.4$ |
|  |  |  | $R_4 = +83.5$ | $s_2 = 15.2$ |
| III | 1.720 | 29.3 | $R_5 = -100.1$ | $t_3 = 13.7$ |
| IV | 1.617 | 54.9 | $R_6 = +40.9$ | $t_4 = 43.0$ |
|  |  |  | $R_7 = -74.3$ | $s_3 = 14.3$ |
| V | 1.880 | 41.1 | $R_8 = +46.5$ | $t_5 = 24.9$ |
|  |  |  | $R_9 = +57.7$ |  |

WESLEY H. VAN GRAAFEILAND
INVENTOR.

ATTORNEYS

United States Patent Office 3,194,117
Patented July 13, 1965

3,194,117
LARGE APERTURE PROJECTION LENS
Wesley H. Van Graafeiland, Rochester, N.Y., assignor to Eastman Kodak Company, Rochester, N.Y., a corporation of New Jersey
Filed Nov. 13, 1962, Ser. No. 237,403
6 Claims. (Cl. 88—57)

This is a continuation-in-part of my patent application Serial No. 134,255, filed August 28, 1961.

This invention relates to projection lenses.

It is the object of the invention to provide an extremely high aperture projection lens on the order of $f/1.0$ relative aperture, of high definition and particularly well corrected with respect to distortion, spherical aberration and astigmatism.

It is a particular object of the invention to provide such a lens having a large back focus equal to about 1/5 or 1/6 the effective focal length of the objective. It is fortunate that by the present invention it is possible to get such a long back focus with such a large aperture lens, without sacrificing optical quality.

One special object of a preferred feature of the invention is to correct the "lower rim ray."

The continuation-in-part illustrates how the invention may be applied to lenses of slightly lower apertures (say $f/1.3$) and gain even greater correction of aberrations.

The continuation-in-part also illustrates how the invention may be used to provied a lens of $f/0.9$ relative aperture with good correction.

The lens consists essentially of four components the first, second and fourth being positive and the third being compound with a highly curved cemented surface. Such arrangements have previously been used to give high aperture lenses and the present invention constitutes improvements over such previous attempts. By the present invention higher aperture and better correction are both obtained. One particularly noticeable feature of the present invention is the fact that the rear surface of the lens is concave to the rear whereas prior lenses had this surface convex. One feature of the present invention is the fact that a reasonable flatness of field is maintained even though the rear surface is made concave to the rear. Another special feature of the preferred embodiments of the invention is the relatively great thickness of the compound third component; it is this feature which reduces rim ray deviation.

Many years ago Joseph Petzval designed a projection lens consisting of two widely spaced doublets each consisting of two spaced or cemented elements. This is all very well known and the history of the development of the Petzval type lens has been described in many textbooks and publications. Exceptionally good corrections were obtainable up to an aperture $f/1.6$ but higher apertures were not obtained until the introduction of the field flattener about 25 or 30 years ago. Such modified Petzval systems, particularly if a third positive component was introduced betwen the two doublets, led to lenses with apertures as great as $f/1.2$. However, the use of a field flattener creates problems because of its nearness to the film plane. The present invention overcomes these problems and at the same time provides lenses of apertures as high as $f/1.0$. This permits higher screen illumination or the use of larger screens and furthermore the present invention gives an improved image quality capable of doing justice to the improved definition obtained by the most recent color films. Alternatively, the present invention when applied to $f/1.2$ or $f/1.3$ lenses gives improved quality and still eliminates any need for a field flattener.

Thus an object of the present invention is to provide an inexpensive lens of long back focal length (i.e. without a field flattener) and with an aperture of $f/1.0$ (or even $f/0.9$) but with performance characteristics equal to the best prior lens or with an aperture of $f/1.2$ or $f/1.3$ and greatly improved image quality. The high degree of correction of the present lens shows up under critical mathematical analysis when a sufficient number of rays are traced through the system to determine the energy distribution in the image at each point.

According to the invention, the projection lens contains five elements, the third and fourth being cemented to form a doublet. The three single elements as well as the cemented doublet are all positive in power, the front and rear lens being strong. However, the relatively weak cemented doublet is made up of a very strong negative lens and a very strong positive lens. The negative lens and the cemented surface produce the only dispersive action in the system. The very high aperture requires an abundance of collective action in the first two elements whereby the diameter of a bundle of rays entering the doublet is reasonably small. In order to obtain adequate back focal length without increasing astigmatism, the lens has a small rear air space and a relatively thin rear lens. Some advantage in this direction is also gained by the use of high index glass in the rear element.

Increasing the index of the second element aids in reducing the Petzval sum, which in turn reduces the astigmatism. Adjustments in the second element serve to reduce overcorrection of spherical aberration and to improve zonal correction. Any residual distortion may be reduced by weakening the power of the rear lens and adjusting the other aberrations in conventional manner. Although the simultaneous accomplishment of all of these improvements involved a number of years of design, the ultimate design represented by the following examples is quite simple in appearance and relatively inexpensive to manufacture.

The advantages of the present invention are accomplished by incorporating certain principles in the lens which require the radii of curvature, thicknesses and spacings (denoted in conventional manner) to be within the following ranges when expressed in terms of the focal length of the lens.

TABLE $.9F < +R_1 < 1.2F$
$8.0F < +R_2 \leq \text{infinity}$
$.5F < +R_3 < 1.5F$
$.5F < +R_4 < 2.0F$
$.8F < -R_5 < 2.0F$
$.25F < +R_6 < .45F$
$.5F < -R_7 < 1.0F$
$.35F < +R_8 < .6F$
$.2F < +R_9 < \text{infinity}$
$.15F < t_1 < .5F$
$.01F < S_1 < .2F$
$.05F < t_2 < .5F$
$.07F < S_2 < .4F$
$.01F < t_3 < .5F$
$.2F < t_4 < .6F$
$.01F < S_3 < .4F$
$.05F < t_5 < .5F$ In the most preferred embodiments $-R_7$ is between $.66F$ and $.9F$ and $R_9$ is less than $F$. Furthermore all of the elements are unusually thick and in these preferred embodiments $t_2$ is between $.2F$ and $.4F$, $t_3+t_4$ total between .4F and .8F, and $t_5$ is between .2F and .35F. Finally in the preferred embodiments $S_3$ is between .01F and .2F.

In general all of the glasses have indices of refraction greater than 1.6 which feature was also used in prior lenses, but in the preferred embodiments of the present invention the second, third and fifth elements have indices of refraction greater than 1.7 and sometimes as high as 1.88.

Figures 1, 2:
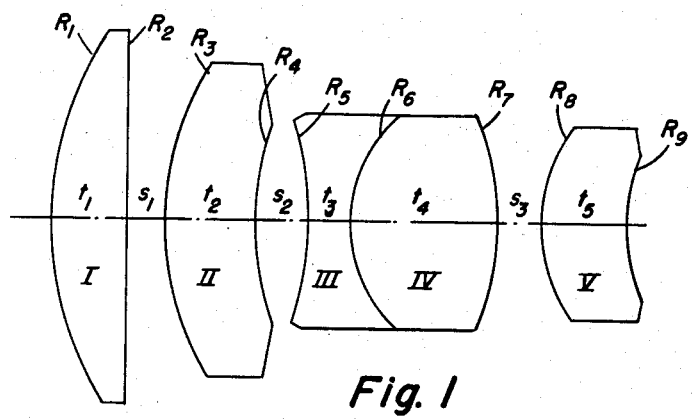
FIG. 1 illustrates an axial section of a lens incorporating the invention.
FIG. 2 is a table of the specifications of a preferred embodiment.

The following are twelve specific examples of the lens illustrated in the drawing. Each of the examples has its own advantage, some having slightly longer back focal length than the others and some being particularly well corrected for distortion or astigmatism although all twelve examples have exceptionally good correction for all aberrations

Example 1

[F/1.0.  F=100.  BF=15.8]

| Lens | $N_D$ | V | Radii | Spacings |
|---|---|---|---|---|
| I | 1.617 | 54.9 | $R_1=+109.2$ | $t_1=22.4$ |
|   |       |      | $R_2=+8,200.7$ | $S_1=2.6$ |
| II | 1.605 | 43.6 | $R_3=+67.3$ | $t_2=21.1$ |
|    |       |      | $R_4=+65.5$ | $S_2=24.6$ |
| III | 1.751 | 27.8 | $R_5=-107.9$ | $t_3=6.6$ |
|     |       |      | $R_6=+40.1$ |            |
| IV | 1.670 | 47.2 | $R_7=-88.3$ | $t_4=45.8$ |
|    |       |      |              | $S_3=18.8$ |
| V | 1.734 | 51.0 | $R_8=+44.6$ | $t_5=31.8$ |
|   |       |      | $R_9=+59.0$ |            |

Example 2

[F/1.0.  F=100.  BF=16.0]

| Lens | $N_D$ | V | Radii | Spacings |
|---|---|---|---|---|
| I | 1.617 | 54.9 | $R_1=+110.9$ | $t_1=22.4$ |
|   |       |      | $R_2=$infinity | $S_1=2.6$ |
| II | 1.605 | 43.6 | $R_3=+67.3$ | $t_2=21.1$ |
|    |       |      | $R_4=+65.5$ | $S_2=24.6$ |
| III | 1.751 | 27.8 | $R_5=-103.0$ | $t_3=6.6$ |
|     |       |      | $R_6=+41.0$ |            |
| IV | 1.670 | 47.2 | $R_7=-85.6$ | $t_4=45.9$ |
|    |       |      |              | $S_3=19.7$ |
| V | 1.734 | 51.0 | $R_8=+44.6$ | $t_5=31.8$ |
|   |       |      | $R_9=+59.0$ |            |

Example 3

[F/1.0.  F=100.  BF=21.8]

| Lens | $N_D$ | V | Radii | Spacings |
|---|---|---|---|---|
| I | 1.611 | 58.8 | $R_1=+106.9$ | $t_1=22.4$ |
|   |       |      | $R_2=+4,029.9$ | $S_1=2.6$ |
| II | 1.605 | 43.6 | $R_3=+64.6$ | $t_2=21.1$ |
|    |       |      | $R_4=+62.3$ | $S_2=23.6$ |
| III | 1.720 | 29.3 | $R_5=-109.2$ | $t_3=14.7$ |
|     |       |      | $R_6=+39.5$ |            |
| IV | 1.617 | 54.9 | $R_7=-80.1$ | $t_4=45.8$ |
|    |       |      |              | $S_3=10.0$ |
| V | 1.880 | 41.1 | $R_8=+47.4$ | $t_5=27.5$ |
|   |       |      | $R_9=+58.3$ |            |

Example 4

[F/1.0.  F=100.  BF=21.0]

| Lens | $N_D$ | V | Radii | Spacings |
|---|---|---|---|---|
| I | 1.611 | 58.8 | $R_1=+104.3$ | $t_1=22.3$ |
|   |       |      | $R_2=+1,949.1$ | $S_1=10.6$ |
| II | 1.880 | 41.1 | $R_3=+72.0$ | $t_2=21.0$ |
|    |       |      | $R_4=+66.3$ | $S_2=19.1$ |
| III | 1.720 | 29.3 | $R_5=-103.4$ | $t_3=14.6$ |
|     |       |      | $R_6=+39.9$ |            |
| IV | 1.611 | 58.8 | $R_7=-75.0$ | $t_4=45.4$ |
|    |       |      |              | $S_3=11.5$ |
| V | 1.880 | 41.1 | $R_8=+44.1$ | $t_5=26.3$ |
|   |       |      | $R_9=+50.7$ |            |

Example 5

[F/1.0.  F=100.  BF=17.9]

| Lens | $N_D$ | V | Radii | Spacings |
|---|---|---|---|---|
| I | 1.611 | 58.8 | $R_1=+100.6$ | $t_1=22.0$ |
|   |       |      | $R_2=+1,341.3$ | $S_1=10.5$ |
| II | 1.880 | 41.1 | $R_3=+88.2$ | $t_2=26.4$ |
|    |       |      | $R_4=+85.6$ | $S_2=18.6$ |
| III | 1.720 | 29.3 | $R_5=-102.0$ | $t_3=14.4$ |
|     |       |      | $R_6=+39.4$ |            |
| IV | 1.611 | 58.8 | $R_7=-73.9$ | $t_4=44.8$ |
|    |       |      |              | $S_3=13.4$ |
| V | 1.880 | 41.1 | $R_8=+38.9$ | $t_5=22.4$ |
|   |       |      | $R_9=+43.4$ |            |

Example 6

[F/1.0.  F=100.  BF=20.3]

| Lens | $N_D$ | V | Radii | Spacings |
|---|---|---|---|---|
| I | 1.611 | 58.8 | $R_1=+108.7$ | $t_1=21.7$ |
|   |       |      | $R_2=$infinity | $S_1=11.6$ |
| II | 1.880 | 41.1 | $R_3=+86.7$ | $t_2=26.4$ |
|    |       |      | $R_4=+83.5$ | $S_2=15.2$ |
| III | 1.720 | 29.3 | $R_5=-100.1$ | $t_3=13.7$ |
|     |       |      | $R_6=+40.9$ |            |
| IV | 1.617 | 54.9 | $R_7=-74.3$ | $t_4=43.0$ |
|    |       |      |              | $S_3=14.3$ |
| V | 1.880 | 41.1 | $R_8=+46.5$ | $t_5=24.9$ |
|   |       |      | $R_9=+57.7$ |            |

Example 7

[F/1.0.  F=100.  BF=18.0]

| Lens | $N_D$ | V | Radii | Spacings |
|---|---|---|---|---|
| I | 1.611 | 58.8 | $R_1=+112.0$ | $t_1=21.1$ |
|   |       |      | $R_2=+6,020.0$ | $S_1=14.0$ |
| II | 1.880 | 41.1 | $R_3=+106.5$ | $t_2=31.7$ |
|    |       |      | $R_4=+124.5$ | $S_2=12.3$ |
| III | 1.720 | 29.3 | $R_5=-101.7$ | $t_3=12.8$ |
|     |       |      | $R_6=+42.0$ |            |
| IV | 1.617 | 54.9 | $R_7=-73.8$ | $t_4=40.6$ |
|    |       |      |              | $S_3=17.0$ |
| V | 1.880 | 41.1 | $R_8=+47.4$ | $t_5=23.4$ |
|   |       |      | $R_9=+57.1$ |            |

Example 8
[F/1.0.  F=100.  BF=18.3]

| Lens | $N_D$ | V | Radii | Spacings |
|---|---|---|---|---|
| I | 1.611 | 58.8 | $R_1=+112.0$ <br> $R_2=+4,820.0$ | $t_1=21.2$ <br> $S_1=13.5$ |
| II | 1.804 | 41.8 | $R_3=+105.4$ <br> $R_4=+129.2$ | $t_2=31.7$ <br> $S_2=12.4$ |
| III | 1.720 | 29.3 | $R_5=-101.9$ <br> $R_6=+42.4$ | $t_3=12.8$ |
| IV | 1.617 | 54.9 | $R_7=-74.0$ | $t_4=40.7$ <br> $S_3=16.2$ |
| V | 1.804 | 41.8 | $R_8=+44.8$ <br> $R_9=+54.3$ | $t_5=23.4$ |

The following example illustrates that by the invention, the aperture may be made as wide as f/0.9 and still give acceptable corrections. In this case the radius $R_7$ is smaller and is specifically $-.66F$.

Example 9
[F/0.9.  F=100.  BF=18.2]

| Lens | $N_D$ | V | Radii | Spacings |
|---|---|---|---|---|
| I | 1.611 | 58.8 | $R_1=+119.3$ <br> $R_2=+2,134.0$ | $t_1=30.3$ <br> $S_1=12.1$ |
| II | 1.804 | 41.8 | $R_3=+105.4$ <br> $R_4=+142.4$ | $t_2=22.4$ <br> $S_2=18.2$ |
| III | 1.689 | 30.9 | $R_5=-91.9$ <br> $R_6=+44.3$ | $t_3=12.8$ |
| IV | 1.573 | 57.4 | $R_7=-66.4$ | $t_4=40.5$ <br> $S_3=17.9$ |
| V | 1.804 | 41.8 | $R_8=+43.8$ <br> $R_9=+54.1$ | $t_5=23.4$ |

Example 10
[F/1.3.  F=100.  BF=17.9]

| Lens | $N_D$ | V | Radii | Spacings |
|---|---|---|---|---|
| I | 1.617 | 54.9 | $R_1=+99.2$ <br> $R_2=+1,014.0$ | $t_1=16.9$ <br> $S_1=10.2$ |
| II | 1.611 | 58.8 | $R_3=+61.0$ <br> $R_4=+56.1$ | $t_2=26.3$ <br> $S_2=9.0$ |
| III | 1.720 | 29.3 | $R_5=-143.2$ <br> $R_6=+32.6$ | $t_3=28.0$ |
| IV | 1.611 | 58.8 | $R_7=-86.1$ | $t_4=35.2$ <br> $S_3=3.2$ |
| V | 1.673 | 32.0 | $R_8=+44.3$ <br> $R_9=+51.7$ | $t_5=32.7$ |

Example 11
[F/1.2.  F=100.  BF=17.6]

| Lens | $N_D$ | V | Radii | Spacings |
|---|---|---|---|---|
| I | 1.611 | 57.2 | $R_1=+97.6$ <br> $R_2=+931.0$ | $t_1=19.2$ <br> $S_1=10.1$ |
| II | 1.611 | 58.8 | $R_3=+61.0$ <br> $R_4=+56.2$ | $t_2=26.3$ <br> $S_2=9.0$ |
| III | 1.720 | 29.3 | $R_5=-141.2$ <br> $R_6=+32.6$ | $t_3=28.0$ |
| IV | 1.611 | 58.8 | $R_7=-85.5$ | $t_4=35.2$ <br> $S_3=3.3$ |
| V | 1.673 | 32.0 | $R_8=+43.2$ <br> $R_9=+50.3$ | $t_5=31.5$ |

Example 12
[F/1.3.  F=100.  BF=17.9]

| Lens | $N_D$ | V | Radii | Spacings |
|---|---|---|---|---|
| I | 1.611 | 58.8 | $R_1=+98.3$ <br> $R_2=+1,006.0$ | $t_1=21.4$ <br> $S_1=9.3$ |
| II | 1.611 | 58.8 | $R_3=+61.0$ <br> $R_4=+56.2$ | $t_2=26.3$ <br> $S_2=9.0$ |
| III | 1.720 | 29.3 | $R_5=-143.2$ <br> $R_6=+32.6$ | $t_3=28.0$ |
| IV | 1.611 | 58.8 | $R_7=-86.1$ | $t_4=35.2$ <br> $S_3=5.2$ |
| V | 1.649 | 33.8 | $R_8=+40.0$ <br> $R_9=+49.5$ | $t_5=28.5$ |

It will be noted that all of the examples are within the ranges necessary to the present invention and that some of them are within the preferred ranges.

Having thus described various examples of my invention it is to be understood that the invention is not limited thereto but is of the scope of the appended claims.

I claim:
1. An objective comprising five elements numbered from the long conjugate side, having radii of curvatures $R_1$ to $R_9$, thicknesses $t_1$ to $t_5$ and spacings $S_1$ to $S_3$ all with subscripts numbered from the long conjugate side, within the following ranges, where F is the equivalent focal length of the objective, the third and fourth elements being cemented together,

$$.9F < +R_1 < 1.2F$$
$$8.0F < +R_2 \leq \text{infinity}$$
$$.5F < +R_3 < 1.5F$$
$$.5F < +R_4 < 2.0F$$
$$.8F < -R_5 < 2.0F$$
$$.25F < +R_6 < .45F$$
$$.5F < -R_7 < 1.0F$$
$$.35F < +R_8 < .6F$$
$$.2F < +R_9 < \text{infinity}$$
$$.15F < t_1 < .5F$$
$$.01F < S_1 < .2F$$
$$.05F < t_2 < .5F$$
$$.07F < S_2 < .4F$$
$$.01F < t_3 < .5F$$
$$.2F < t_4 < .6F$$
$$.01F < S_3 < .4F$$
$$.05F < t_5 < .5F$$

2. An objective according to claim 1 in which $R_7$ is between $-.66F$ and $-.9F$, $R_9$ is less than F, $t_2$ is between .2F and .4F, $t_3+t_4$ is between .4F and .8F, $S_3$ is between .01F and .2F and $t_5$ is between .2F and .35F.

3. An objective according to claim 1 in which the index of refraction of the second, third and fifth elements is greater than 1.7.

4. An objective according to claim 1 in which $R_9$ is between .2F and F.

5. An objective according to claim 1 in which $t_3+t_4$ is between .4F and .8F.

6. An objective according to claim 1 in which the index of refraction of the second and fifth elements is 1.88.

No references cited.

JEWELL H. PEDERSEN, *Primary Examiner.*

FREDERICK M. STRADER, *Examiner.*